United States Patent [19]

Ball

[11] 4,423,326

[45] Dec. 27, 1983

[54] FIRE OR EXPLOSION DETECTION

[75] Inventor: David N. Ball, Slough, England

[73] Assignee: Graviner Limited, Great Britain

[21] Appl. No.: 328,882

[22] Filed: Dec. 9, 1981

[30] Foreign Application Priority Data

Dec. 12, 1980 [GB] United Kingdom ................. 8039929

[51] Int. Cl.[3] ................................................ G01J 1/00

[52] U.S. Cl. .................................... 250/339; 250/349; 340/578

[58] Field of Search ........................ 250/339, 349, 338; 340/578

[56] References Cited

U.S. PATENT DOCUMENTS 4,101,767 7/1978 Lennington ......................... 250/339

*Primary Examiner*—Alfred E. Smith
*Assistant Examiner*—T. N. Grigsby
*Attorney, Agent, or Firm*—John K. Williamson

[57] ABSTRACT

A fire or explosion detection system for discriminating between radiation produced by a source of fire or explosion to be detected (e.g. a hydrocarbon fire) and radiation produced by a source not to be detected (e.g. an incendiary ammunition and or pyrophoric reaction between an aircraft skin and an inert round) is disclosed. The radiation detectors are respectively responsive to the intensity of radiation in narrow wavelength bands at 0.96 and 4.4 microns. Two threshold units produce respective electrical signals only when the outputs of the detectors exceed respective predetermined values. In addition, a rate of rise unit produces an electrical signal only when the rate of rise of the output of one of the detectors exceeds a predetermined value. An output gate receives these three electrical signals and produces an output to a delay unit which in turn produces a fire or explosion indicating output only when the output of the gate continuously exists for at least a predetermined period of time. It is found that only fires or explosions to be detected will cause the detectors to produce outputs which will maintain the output of the gate for the length of the delay period.

11 Claims, 8 Drawing Figures

FIRE OR EXPLOSION DETECTION

BACKGROUND OF THE INVENTION

The invention relates to fire and explosion detection systems and more specifically to systems which are able to discriminate between fires and explosions which need to be detected and those which do not.

BRIEF SUMMARY OF THE INVENTION

According to the invention, there is provided a fire and explosion detection system for discriminating between radiation produced by a source of fire or explosion to be detected and radiation produced by a source of fire not to be detected, comprising first and second radiation detecting means respectively responsive to radiation in different wavelength bands to produce first and second electrical signals respectively, and output means connected to monitor the first and second electrical signals and operative to produce a fire or explosion indication output only when, for at least a predetermined period of time, the magnitude of each signal exceeds a respective predetermined value and the rate of rise of at least the said first signal exceeds a predetermined value.

According to the invention, there is also provided a fire or explosion detection system for discriminating between radiation produced by a source of fire or explosion to be detected and radiation produced by a source not to be detected, comprising first and second radiation detecting means respectively responsive to the intensity of radiation in different and spaced apart narrow wavelength bands to produce first and second electrical signals respectively, the wavelength band of the first detecting means including a wavelength characteristic of a source of fire or explosion not to be detected and the wavelength band of the second detecting means including a wavelength characteristic of a source of radiation to be detected, threshold means responsive to the first electrical signal to produce a third electrical signal only when the magnitude of the first electrical signal exceeds a predetermined value, second threshold means responsive to the second electrical signal to produce a fourth electrical signal only when the magnitude of the second electrical signal exceeds a predetermined value, rate of rise means responsive to the first electrical signal to produce a fifth electrical signal only when the rate of rise of the first electrical signal exceeds a predetermined value, and output means connected to receive the third, fourth and fifth signals and operative to produce a fire or explosion indicating output only when they simultaneously and continuously exist for at least a predetermined period of time.

DESCRIPTION OF THE DRAWINGS

Fire and explosion detection systems embodying the invention will now be described, by way of example only, with reference to the accompanying diagrammatic drawings in which.

DESCRIPTION OF PREFERRED EMBODIMENTS

The system now to be described is particularly, though not exclusively, for use in situations where it is necessary to discriminate between (a) a first case where radiation is produced by the explosion or burning of an explosive or incendiary ammunition round or produced by an inert ammunition round or fragments thereof striking the protective skin or armour of a vehicle or the like, such as a battle tank or aircraft, and (b) a second case where radiation is produced by a fire or explosion of combustible or explosive material (such as hydrocarbons) which is set off by such ammunition rounds or fragments. The system is therefore arranged so as to detect the second case but not the first case, and in this way it can initiate action so as to suppress the fire or explosion in the second case but not initiate such suppression action in response to the first case.

One particular application of the system is for protecting regions adjacent to the fuel tanks in aircraft which may be attacked either by explosive or incendiary ammunition rounds or by ammunition rounds which direct high velocity inert fragments at the aircraft. In such an application, the system is arranged to respond to hydrocarbon fires (that is, involving the fuel carried by the aircraft) as set off by such ammunition rounds, but not to detect either the round itself (where it is explosive or incendiary) or the secondary nonhydrocarbon fire which may be produced by a pyrophoric combustion of materials from the skin of the aircraft and initiated by the inert fragments.

Figure 1:
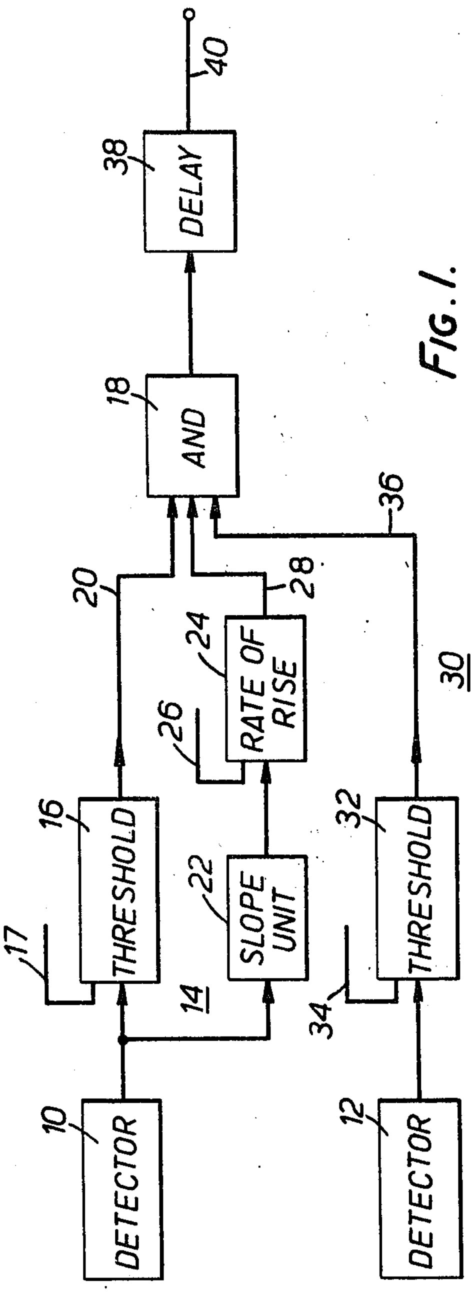
FIG. 1 is a block diagram of one of the systems.

As shown in FIG. 1, one form of the system comprises two radiation detectors 10 and 12 each of which produces an electrical output in response to radiation produced. Detector 10 is made sensitive to radiation at about 1 micron, e.g. in a narrow wavelength band centered at 0.96 microns. Detector 12 is arranged to be sensitive to radiation in a narrow wavelength band at 4.4 microns.

For example, detector 10 may be a silicon diode sensor and detector 12 may be a thermopile sensor, each viewing the radiation through an appropriate filter. Instead, both detectors could be thermopile sensors, again viewing the radiation through appropriate filters. Another possibility is for detector 10 to be a silicon diode sensor and detector 12 a lead selenide sensor, each again viewing the radiation through an appropriate filter. A further possibility would be for each detector to be a lead selenide sensor, each viewing the radiation through an appropriate filter.

Initially, it will be assumed that detector 10 is a silicon diode sensor while detector 12 is a thermopile sensor.

Detector 10 is connected to feed its electrical output to a channel 14. In the channel 14, the output of the detector is compared in a threshold unit 16 with a predetermined reference level received on a line 17. If the signal level is such as to indicate that the detector is receiving radiation (at 0.96 microns) having an intensity greater than the predetermined value represented by the reference signal on line 17, the output of the threshold unit 16 changes from binary "0" to binary "1" and this is fed to an AND gate 18 on a line 20.

In addition, channel 14 includes a differentiating or similar circuit 22 which receives the output of detector 10 and produces a signal dependent on its rate of change. This signal is passed to a rate of rise unit 24 where the sign and magnitude of the rate of change of the detector output is compared with a reference signal received on a line 26. If the rate of rise unit 24 determines that the intensity of radiation received by detector 10 is rising at more than a predetermined rate represented by the reference signal on line 26, its output changes from binary "0" to binary "1" and is fed to AND gate 18 on a line 28.

The output of detector 12 is fed to a channel 30. Channel 30 comprises a threshold unit 32 which compares the detector output with a reference signal received on a line 34. If the threshold unit 32 determines that the radiation received by detector 12 has an intensity greater than the predetermined value represented by the reference signal on line 34, its output changes from binary "0" to binary "1" and is fed to AND gate 18 on a line 36.

When all the inputs of AND gate 18 are binary "1", the output of the AND gate changes from binary "0" to binary "1" and is fed to a delay circuit 38 having a predetermined delay of, say, 2 milliseconds. If the binary "1" output of AND gate 18 is maintained for at least this delay period, the delay unit 38 produces a fire or explosion indicating output on a line 40. This may be used to initiate fire or explosion suppression.

The operation of the system will now be considered in more detail with reference to FIGS. 2 to 4. In FIGS. 2 to 4, the threshold levels applied by the reference signals on lines 18 and 34 are shown at S1 and S2.

Figure 2A:
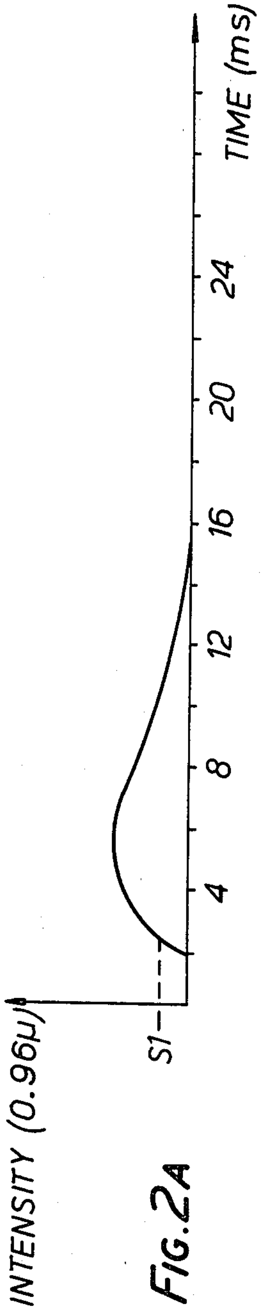
FIG. 2A is a graph of signal output from a radiation detector responsive to a particular wavelength, plotted against time, for a source of fire or explosion which the system is required not to detect.
Figure 2B:
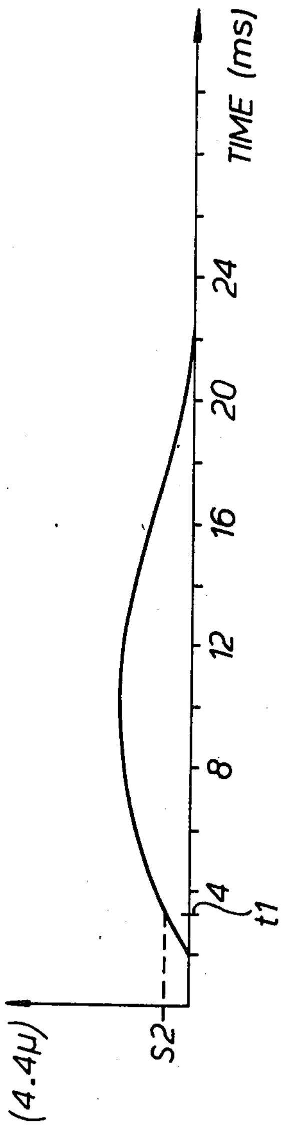
FIG. 2B is a similar graph but for a different detector responsive to a different wavelength.

FIG. 2A illustrates the output of detector 10 in response to the intensity of the radiation which it receives resulting from the striking of the aircraft by an incendiary round, and FIG. 2B shows the output of detector 12 in the same situation. It is assumed that no hydrocarbon fire is started by the round. Therefore, the system is required not to initiate fire or explosion suppression.

Because the detector 10 is a photo-electric type sensor, its output will rise more rapidly than detector 12 (which is a thermopile type sensor). Therefore, it is not until time t1 that the outputs of both detectors have exceeded the respective thresholds. At this time, also, the output of detector 10 is still rising, and it is assumed that it is rising at greater than the predetermined rate applied by the reference signal on line 26. Therefore, AND gate 18 now produces a "1" output. However, this does not immediately energise line 40 because of the 2 millisecond delay applied by the delay unit 38. It will be apparent that the output of the detector 10 will have ceased to rise, and in fact started to fall, before the end of this 2 millisecond period.

The result is, therefore, that no fire or explosion suppression output is produced on line 40.

Figure 3A:
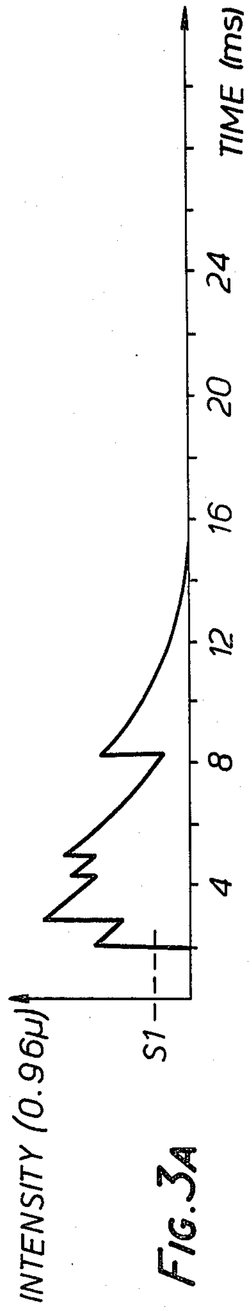
FIGS. 3A and 3B correspond respectively to FIGS. 2A and 2B and are for the same wavelengths, but are in respect of another source of fire or explosion, again one which the system is required not to detect.
Figure 3B:
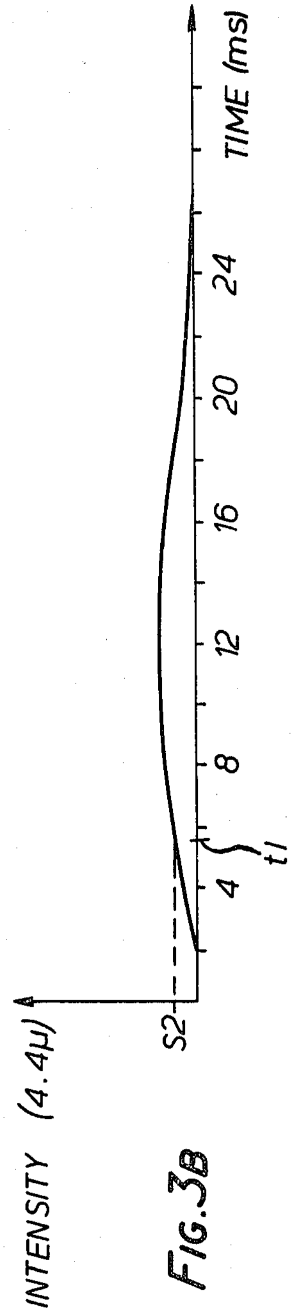

FIGS. 3A and 3B correspond to FIGS. 2A and 2B but illustrate the situation where the aircraft is struck not by an incendiary round but by impacts of inert fragments. Again, it is assumed that no hydrocarbon fire takes place. Therefore, the system is required not to initiate fire or explosion suppression.

Again, because detector 10 is a photo-electric type sensor, its output will rise rapidly in response to the first inert fragment impact, which will produce a burst of radiation due to the pyrophoric reaction of the aircraft's skin. In FIG. 3A it is assumed that four further impacts occur, each producing further bursts of radiation. During this time, the output of the thermopile sensor 12 rises much more slowly.

At time t1, it will be apparent that the outputs of both detectors have exceeded the thresholds S1 and S2. Furthermore, the occurrence of later impacts of inert fragments will cause the output of detector 10 to rise rapidly, and at a rate greater than the predetermined rate of rise represented by the signal on line 26. Therefore, AND gate 18 will produce a "1" output following each fragment impact. However, delay unit 38 will prevent this output from energising line 40, and it will be apparent that no such output will be produced provided that the pattern of impacts produced by the inert fragment is such that the binary "1" output is not maintained continuously for more than 2 milliseconds.

Figure 4A:
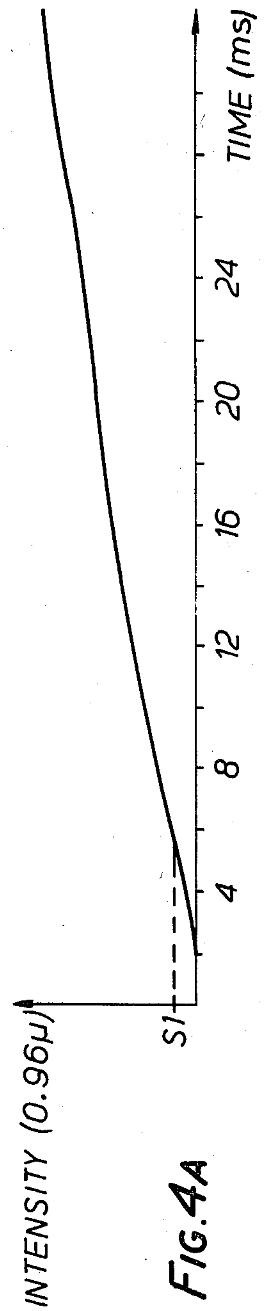
FIGS. 4A and 4B correspond respectively to FIGS. 2A and 2B and are again for the same wavelengths but in this case are for a fire or explosion which the system is required to detect.
Figure 4B:
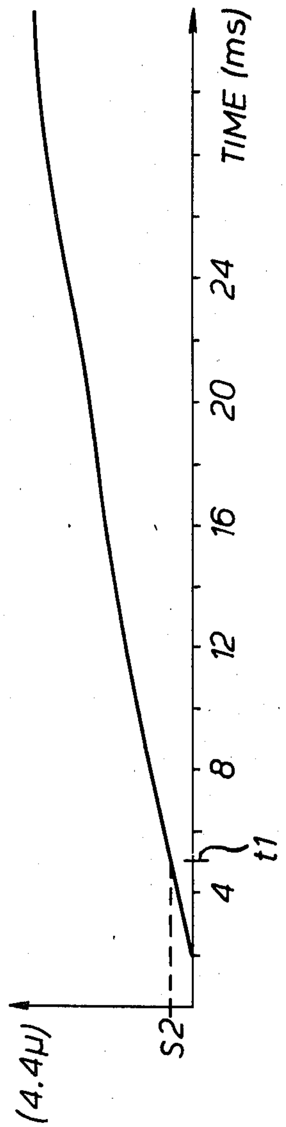

FIGS. 4A and 4B correspond to FIGS. 2A and 2B, respectively, and to FIGS. 3A and 3B, respectively, but show the situation where a fuel fire has been set off. Therefore, the system is required to initiate fire or explosion suppression action.

As shown, the outputs of both detectors rise steadily in response to the fire. At time t1, both detector outputs will have exceeded the respective thresholds, and the output of detector 10 is rising at greater than the predetermined rate of rise. AND gate 18 therefore produces a "1" output which will be maintained for more than the 2 millisecond period of delay unit 38. Therefore, after this time, delay unit 38 will energise line 40 and thereby initiate fire or explosion suppression.

The situation may arise where an incendiary round, or a burst of pyrophorically produced radiation, occurs so close to detector 10 as to saturate it or to saturate its associated amplification circuitry. A unit may be provided and arranged to respond to detection of such saturation by changing its output from binary "1" to binary "0" and this output is connected to AND gate 18 and therefore prevents production of a fire or explosion suppression signal in the event of such saturation.

Figure 5:
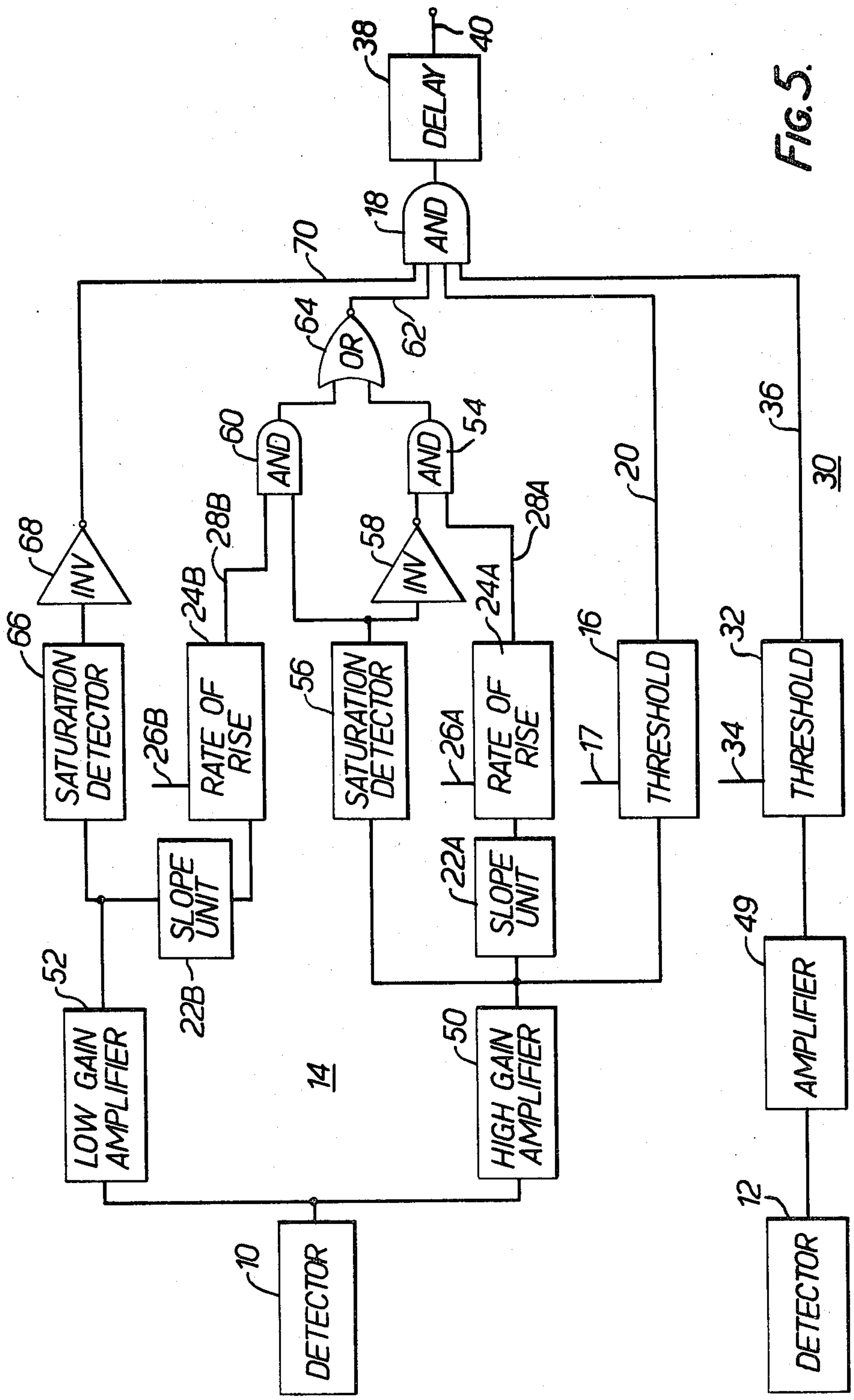
FIG. 5 is a block diagram of a modified form of the system.

FIG. 5 shows a modified form of the system of FIG. 1, and items in FIG. 5 corresponding to those in FIG. 1 are similarly referenced.

As shown, channel 30 in the system of FIG. 5 is the same as in the system of FIG. 1 (the simplified circuit of FIG. 1 does not show a specific amplifier corresponding to amplifier 49, but one would normally be provided in order to process the output from detector 12). Channel 14 in the system of FIG. 5 is, however, modified.

In fact, channel 14 in the system of FIG. 5 comprises high and low gain amplifiers 50 and 52 respectively, which are connected in parallel to receive the output of detector 10. The output of amplifier 50 is compared with a relatively low value threshold in a threshold unit 16 corresponding to threshold 16 of FIG. 1 (this threshold corresponding to "pan fire threshold"). Only if the output of amplifier 50 exceeds this relatively low threshold does the unit 16 produce a binary "1" signal on line 20 to the AND gate 18.

In addition, the output of amplifier 50 is passed through a slope unit 22A to a rate of rise unit 24A corresponding to units 22 and 24 of FIG. 1. When the output of the amplifier is rising at at least the rate of rise threshold set by the signal on line 26A, the rate of rise unit 24A produces a binary "1" output signal on a line 28A which is connected to one input of an AND gate 54; otherwise it produces a binary "0".

Finally, the output of amplifier 50 feeds a saturation detector 56. This has a relatively high threshold corresponding to saturation of amplifier 50. The detector 56 produces a "0" output when amplifier 50 is unsaturated and switches to a "1" output when the amplifier becomes saturated. The binary output of the saturation detector 56 is passed through an inverter 58 to the second input of AND gate 54 and also passes directly to one input of a further AND gate 60.

AND gates 54 and 60 feed a line 62 connected to AND gate 18 via an OR gate 64.

The low gain amplifier 52 feeds a slope unit 22B and a rate of rise unit 24B and feeds a binary "1" output on line 28B to the second input of AND gate 60 if the amplifier output is rising at at least a predetermined rate of rise established by the signal on line 26B; otherwise it produces a binary "0".

In addition, amplifier 52 feeds a saturation detector 66 which determines whether amplifier 52 is saturated or not. The detector 56 produces a binary "0" output if the amplifier is not saturated and this switches to a "1" when the amplifier becomes saturated. The binary output is fed through an inverter 68 to a line 70 connected to AND gate 18.

The operation of the system of FIG. 5 is generally the same as that of FIG. 1, except that the high and low gain amplifiers 50 and 52 enable the system to deal better with low level signals.

Referring to FIGS. 2A, 2B, 3A, 3B, 4A and 4B, the threshold S1 corresponds to the threshold established by threshold unit 16 in FIG. 5 (and the threshold S2 corresponds to that established by the threshold unit 32 in that Figure.) When the signal received by detector 10 is of sufficient magnitude, the high gain amplifier 50 saturates, and saturation detector 56 therefore produces a "1" output which closes AND gate 54 and opens AND gate 60. Therefore, measurement of the rate of rise of the output of detector 10 is carried out by the rate of rise unit 24B in the system of FIG. 5, and the rate of rise unit 24A is ineffective. AND gate 18 therefore responds to the binary signals on lines 20 and 36 from the threshold units 16 and 32 and to the binary signal on line 28B from the rate of rise unit 24B and, in response to these signals, it operates in the manner described above with reference to FIGS. 2A, 2B, 3A, 3B, 4A and 4B. This assumes, of course, that the output of detector 10 is not so high as to saturate detector 66.

If conditions should be such that the output of detector 10 is relatively low, however, it is found that the rate of rise unit 24B may have insufficient insensitivity to be able to determine whether or not the detector output via amplifier 52 is rising at more than the rate of rise threshold. Under these conditions, the low output from the detector is such that amplifier 50 is no longer saturated and the output of saturation detector 56 changes from "1" to "0". Therefore, AND gate 60 becomes blocked and AND gate 54 opens. It is now the rate of rise unit 24A which measures whether or not the output of detector 10 is rising above the predetermined threshold, and AND gate 18 receives a signal accordingly via AND gate 54 and OR gate 64. Because amplifier 50 has a high gain, the sensitivity of measurement is accordingly increased.

If the output of detector 10 becomes sufficiently high so as to saturate both detectors 56 and 66, AND gate 18 is prevented from producing fire or explosion suppression signal.

It will be apparent that it is desirable that, where the sensors forming the detectors 10 and 12 do not have substantially the same time constant, the detector 12 should have a slower response than the detector 10. This will help to ensure that the output of detector 10 will have ceased to rise, and probably commence to fall, before the end of 2 milliseconds (the delay period of delay unit 38) after the time when both detector outputs exceed the respective thresholds. However, the difference in time constants is not important if the delay period of delay unit 38 is made longer than the expected time of the signal from detector 10 to rise from the threshold level S1 to the value where its rate of rise is less than the rate of rise represented by the signal on line 26A.

What is claimed is:

1. A fire and explosion detection system for discriminating between radiation produced by a source of fire or explosion to be detected and radiation produced by a source of fire not to be detected, comprising first and second radiation detecting means respectively responsive to radiation in different wavelength bands to produce first and second electrical signals respectively, and output means connected to monitor the first and second electrical signals and operative to produce a fire or explosion indicating output only when, for at least a predetermined period of time, the magnitude of each signal exceeds a respective predetermined value and the rate of rise of at least the said first signal exceeds a predetermined value.

2. A system according to claim 1, including means connected to the output means and the detection means which prevents the production of the fire or explosion indicating signal for so long as the intensity of radiation received by one of the detecting means is such as to produce saturation in that detecting means.

3. A system according to claim 1, in which one of the wavelength bands includes a wavelength characteristic of a fire or explosion source to be detected.

4. A system according to claim 3, in which the other wavelength band includes a wavelength produced by a source not to be detected.

5. A system according to claim 1, in which the output means includes means operative when the radiation sensed by the first detecting means falls below a relatively low level to increase in a predetermined manner the first signal relative to the radiation sensed so as to facilitate the comparison of its rate of rise (if any) with the predetermined value.

6. A fire or explosion detection system for discriminating between radiation produced by a source of fire or explosion to be detected and radiation produced by a source not to be detected, comprising first and second radiation detecting means respectively responsive to the intensity of radiation in different and spaced apart narrow wavelength bands to produce first and second electrical signals respectively, the wavelength band of the first detecting means including a wavelength characteristic of a source of fire or explosion not to be detected and the wavelength band of the second detecting means including a wavelength characteristic of a source of radiation to be detected, first threshold means responsive to the first electrical signal to produce a third electrical signal only when the magnitude of the first electrical signal exceeds a predetermined value, second threshold means responsive to the second electrical signal to produce a fourth electrical signal only when the magnitude of the second electrical signal exceeds a predetermined value, rate of rise means responsive to the first electrical signal to produce a fifth electrical signal only when the rate of rise of the first electrical signal exceeds a predetermined value, and output means connected to receive the third, fourth and fifth signals and operative to produce a fire or explosion indicating output only when they simultaneously and continuously exist for at least a predetermined period of time.

7. A system according to claim 6, in which the output means comprises an AND gate whose output feeds a delay unit.

8. A system according to claim 6, including first and second amplifying means for respectively amplifying the outputs of the first and second radiation detecting means whereby to produce the first and second electrical signals, and in which the first amplifying means comprises relatively high and relatively low gain amplifiers producing relatively high and relatively low versions of the first electrical signal respectively, the rate of rise means comprising means responsive to the relatively low version of the first electrical signal when the magnitude of one of the versions lies above a predetermined level and responsive to the relatively high version of the first electrical signal when the magnitude of the said one version lies below the predetermined value.

9. A system according to claim 8, in which the predetermined level is the level at which the relatively high gain amplifier becomes saturated and including logic means operative to render the rate of rise means responsive to one or other of the said versions of the first electrical signal according to whether the high gain amplifier is saturated.

10. A system according to claim 8, in which the rate of rise means comprises two rate of rise units each connected to the output of a respective one of the two amplifiers and means operative to render one or other of them operative dependent on the magnitude of the said one signal version in relation to the said predetermined level.

11. A system according to claim 1 or 6, in which the second detecting means has a slower response to the received radiation than the first detecting means.

* * * * *